Dec. 8, 1925.                                     1,564,810
R. F. ANGULO
METHOD OF MAKING HANDMADE MISSION ROOF TILES
Filed March 4, 1922
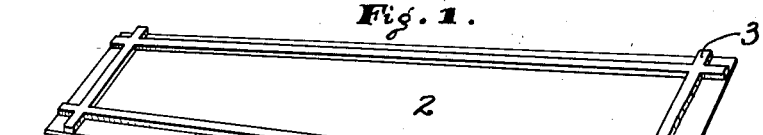
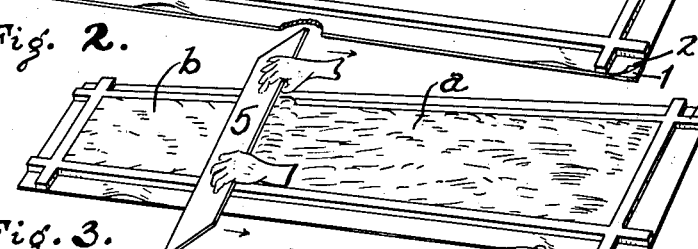
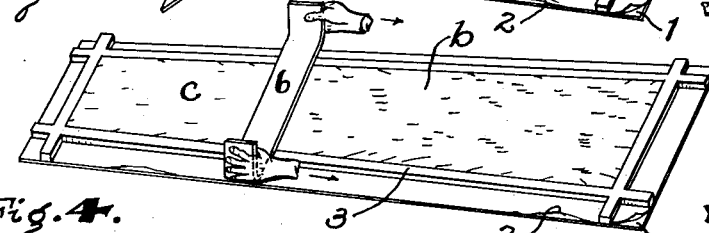
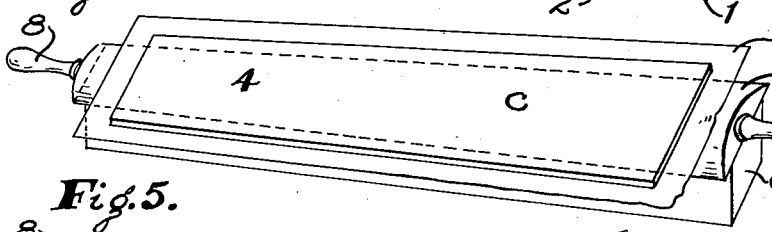
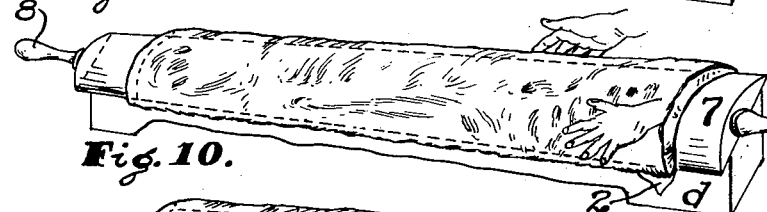
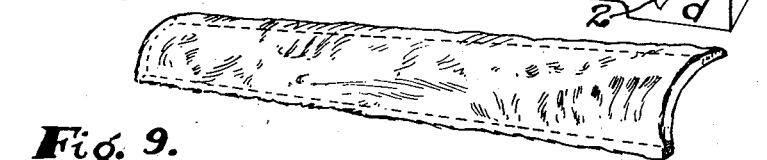
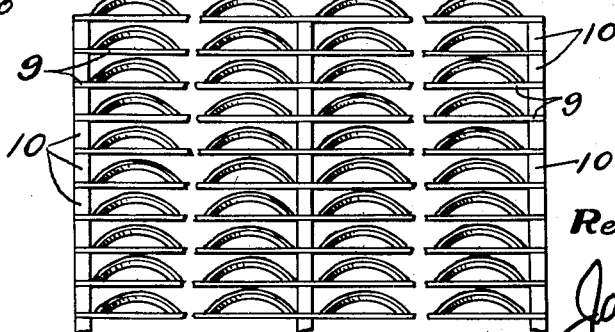
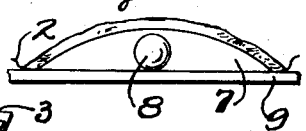
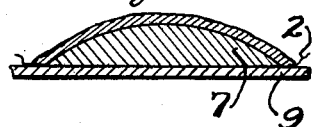
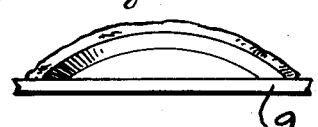
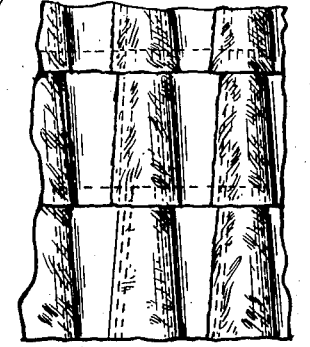
Inventor.
Reducindo F. Angulo.
James R. Townsend
his atty
Witness:
W. M. Gentle, Patented Dec. 8, 1925.

1,564,810

UNITED STATES PATENT OFFICE.

REDUCINDO F. ANGULO, OF SANTA BARBARA, CALIFORNIA.

METHOD OF MAKING HANDMADE MISSION-ROOF TILES.

Application filed March 4, 1922. Serial No. 541,192.

*To all whom it may concern:*

Be it known that I, REDUCINDO F. ANGULO, a citizen of the United States, residing at Santa Barbara, in the county of Santa Barbara and State of California, have invented a new and useful Method of Making Handmade Mission-Roof Tiles, of which the following is a specification.

This invention relates to the manufacture of burnt clay roof tiles having a trough-like shape and which will have the appearance of ancient tile such as that made by the early missionaries of California.

An object of this invention is the practical and economical production of tile having the appearance above stated.

An object of the invention is to provide an economical method to make a rustic fire proof and water proof burnt clay roofing tile and to avoid chipping, checking or bursting of the tiles when on the roof, under high heat or other destructive conditions.

The invention is broadly new, basic and pioneer in that I produce tile having an ancient appearance by first making a flat sheet of plastic clay of the exact dimensions required to produce the tile; said plastic clay sheet being imposed upon a flexible retaining sheet of suitable material such as ordinary newspaper, and then imposing said clay sheet upon a mold pallet conformed to the inside of the proposed tile; the plastic clay being held by said sheet and yet adapted to settle down upon the form to which it is applied: then molding the clay to the pallet by hand and then placing the tile upon a support where it may dry, and then withdrawing the pallet and allowing the clay to thoroughly dry; after which the tile thus formed is burnt in an ordinary well known way.

An object is to economically produce a hand-molded tile having a rustic and ancient appearance, and that can be laid in cement to form a roof in which there will be no nails for securing the tiles in place.

Other objects, advantages and features of invention may appear from the accompanying drawing, the subjoined detail description and the appended claim.

My newly invented method may be understood by reference to the accompanying drawing.

Figure 1 is a perspective view of a mold ready to receive plastic clay for forming a plastic clay slab.

Fig. 2 shows the mold filled and a scraper in operation by hand for removing the surplus clay from the mold.

Fig. 3 shows the plastic clay slab in the process of being smoothed by a smoothing tool operated by hand.

Fig. 4 shows the slab as it is being applied to the convex pallet.

Fig. 5 shows the plastic clay tile in the process of hand molding.

Fig. 6 is an end elevation of a molded tile on a drying tray or board before removal of the pallet.

Fig. 7 is a transverse sectional view of the molded tile, and pallet on a drying board.

Fig. 8 is a view analogous to Fig. 6 after the pallet has been removed.

Fig. 9 is a fragmental view of a stack of trays with the plastic clay tiles thereon for drying.

Fig. 10 is a perspective view of a finished tile.

Fig. 11 is a fragmental view showing ends of the tiles as laid on a roof.

Fig. 12 is a fragmental plan view of the tile shown in Fig. 11.

In practice a flat surface such as a table 1 is provided and a flexible supporting surface shown as a sheet 2 of paper, such as newspaper, is laid upon said flat surface and the mold 3 which is an open rectangular iron frame is laid upon the paper. The inside of said iron frame forms a trapezoid of the dimensions corresponding to the dimensions required for the clay slab 4. The workman will then place in the mold and upon the paper the amount of plastic clay $a$, necessary to fill the mold and will then flatten the same down as at $b$, so as to completely fill the mold; any surplus clay will be scraped off by means of a scraper 5, so that the mold will be evenly filled, and the plastic clay $b$ in the mold will be smoothed by the smoother 6 to form a plastic slab $c$.

The mold will then be removed and the pallet 7 in the shape of a segment of a cone will then be placed with its convex side up, on or below the level of the table with the wide end of the pallet ready to receive the wide end of the slab $c$. Then the slab and the sheet of paper 2 will be slid off of the table onto the pallet. By molding the slab on a sheet of paper means is provided whereby the slab may be easily, quickly, and satisfactorily moved from the moulding table onto the pallet, thus materially adding to the speed and economy of manufacture. The pallet is supported by a narrow support such as a two by four $d$. Then the workman with his bare hands will apply pressure to the surface of the plastic slab to make the same conform to the curvature of the pallet and also to leave impressions of the hand upon the outside of the plastic tile to give the tile a rustic and ancient appearance.

Said pallet is provided at its ends with handles 8 by which it is supported and moved from place to place. The workman by grasping the handles may carry the pallet to the drying tray or board 9 onto which the pallet is laid and then by holding the plastic pallet at the broader end and pulling the pallet out the plastic tile will be supported by its edges resting on the tray.

The trays will be placed one on top of the other and are held in spaced relation by the upright supports 10 inserted between adjacent trays.

The plastic clay tiles will then be maintained in the shade at a moderate temperature of approximately 40 to 60° F. more or less and after four or five days more or less of this moderate drying the tiles are allowed to dry more rapidly as by allowing the air to blow through the trays.

The tiles may be of any appropriate dimensions. The thickness of the completed tile is preferably about ⅝ to ½ inch but the dimensions of the tile may be determined according to the pleasure of the manufacturer or the one for whom they are made.

When the tiles are thoroughly dried they are then placed in the kiln and burnt in the usual way of burning clay products.

The paper is allowed to remain on the inside of the tile until firing when it burns off and may leave creases and grooves according to the folds of the paper thus adding to the tile further appearance of being rustic or of ancient manufacture.

The outside of the tile which is exposed to the weather retains such tracings of the hand molding as may be left when the pallet is removed from the plastic clay tile.

The tiles made in this manner do not contain any compressed air and are sufficiently porous to avoid any checking, cracking or chipping caused by heated air in case the tiles are subjected to the action of fire on a roof, but the tiles are sufficiently impervious to water to serve as a complete roof protection against leaks.

In forming a roof, the frame of the roof is of the usual character covered with sheathing and with any impervious material such as roofing paper placed on the sheathing, the tiles are laid upon their curved backs and laid to receive the cover tiles.

The pan tiles are laid with their wide ends up the slope of the roof and the cover tiles are laid with the wide end down. Edges of the tiles may be cemented to the pan tiles and no nailing is required.

The lower end of the pan tiles of the second course from the edges will be laid into the upper end of the pan tiles of the first course, the upper end of each pan tile will rest upon the impervious sheet of sheathing, the cover tiles will be supported by the pan tiles and will over-lap each other in the customary manner. By the above operations I have provided a practical, economical and superior method whereby ancient or mission, or rustic roof tile can be manufactured with minimum expense, time and labor, and therefore I can place on the market in competition with a machine made product, tile having all the appearances and characteristics above set forth and which from all appearances would indicate that much time, as well as the laborious, and painstaking efforts were employed and which were heretofore necessary to produce a tile having these characteristics.

I have found that by using ordinary newspaper for the flexible supporting surface, the difficulty of making the tile is greatly reduced so that with printed newspaper the tiles may be produced at an average rate of approximately three a minute, while if white, that is to say unprinted, paper is used, the plastic tile will not stand up so well when the pallet is withdrawn; and the process of making the tile requires much more time.

I ascribe this difference to the fact that the inked surface of the printed paper adheres to the tile in such a way as to give a support superior to that which is given by the unprinted sheet.

I claim:

The method of producing a hand-made ancient appearing roof tile which consists in molding a slab of plastic clay upon a sheet supported by a surface, moving said slab and sheet from said surface to a pallet having a curved back, molding said slab to the back of the pallet by means of the hand to form a plastic tile, supporting the edges of the plastic tile and removing the pallet preparatory to drying and burning the tile.

In testimony whereof, I have hereunto set my hand at Santa Barbara, California, this 27th day of February 1922.

REDUCINDO F. ANGULO.